United States Patent
Sudo et al.

(10) Patent No.: US 11,011,199 B2
(45) Date of Patent: May 18, 2021

(54) MAGNETIC DISK DEVICE AND CONTROL METHOD OF SERVO WRITE

(71) Applicants: Kabushiki Kaisha Toshiba, Tokyo (JP); Toshiba Electronic Devices & Storage Corporation, Tokyo (JP)

(72) Inventors: Daisuke Sudo, Yokohama Kanagawa (JP); Takeyori Hara, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/752,969

(22) Filed: Jan. 27, 2020

(65) Prior Publication Data
US 2020/0395044 A1    Dec. 17, 2020

(30) Foreign Application Priority Data
Jun. 14, 2019 (JP) .............................. JP2019-111239

(51) Int. Cl.
  *G11B 5/09* (2006.01)
  *G11B 5/596* (2006.01)
  *G11B 21/10* (2006.01)

(52) U.S. Cl.
  CPC ........ *G11B 5/59627* (2013.01); *G11B 21/106* (2013.01)

(58) Field of Classification Search
None
See application file for complete search history.

(56) References Cited

U.S. PATENT DOCUMENTS

| | | | | |
|---|---|---|---|---|
| 5,526,211 A * | 6/1996 | Hetzler | .................. | G11B 20/10 360/135 |
| 6,388,833 B1 * | 5/2002 | Golowka | ........... | G11B 5/59638 360/51 |
| 6,611,393 B1 * | 8/2003 | Nguyen | ............... | G11B 20/182 360/53 |
| 8,045,287 B1 | 10/2011 | Horisaki et al. | | |
| 9,460,743 B1 * | 10/2016 | Sudo | .................. | G11B 5/59627 |
| 2005/0128617 A1 | 6/2005 | Kuroda et al. | | |
| 2006/0109583 A1 * | 5/2006 | Sado | .................. | G11B 5/59633 360/75 |
| 2010/0118404 A1 * | 5/2010 | Endoh | .................... | G02B 1/118 359/569 |
| 2010/0149674 A1 | 6/2010 | Tomita | | |
| 2011/0188152 A1 * | 8/2011 | Albrecht | ................ | G11B 21/02 360/75 |
| 2012/0087036 A1 * | 4/2012 | Hirano | .................. | B82Y 10/00 360/77.04 |

* cited by examiner

*Primary Examiner* — Peter Vincent Agustin
(74) *Attorney, Agent, or Firm* — White & Case LLP

(57) ABSTRACT

According to one embodiment, a magnetic disk device including a disk, a head, and a controller configured to, when writing a first servo sector, a second servo sector, and a third servo sector in the order described according to a second route varying in a radial direction of the disk with respect to a first route, adjust first timing used to write the second servo sector next to the first servo sector, and adjust second timing used to write the third servo sector next to the second servo sector.

17 Claims, 11 Drawing Sheets

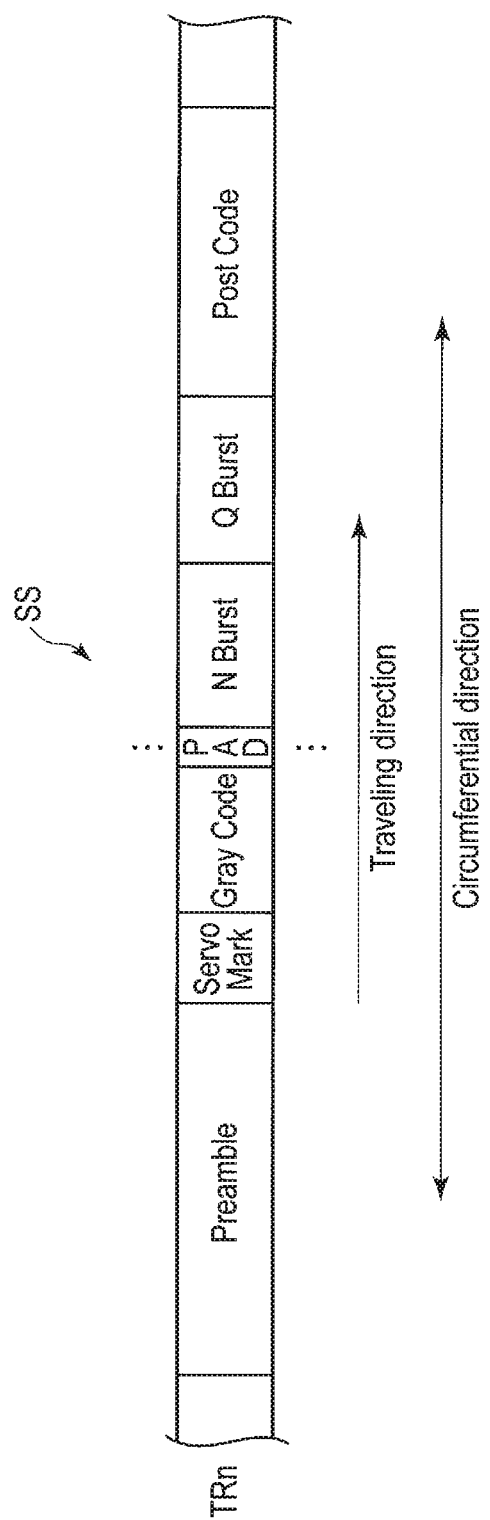
F I G. 3

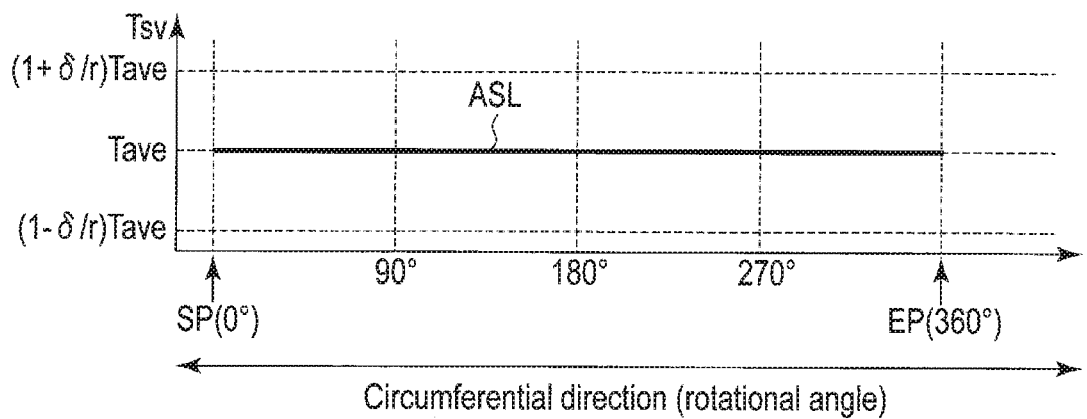
F I G. 9
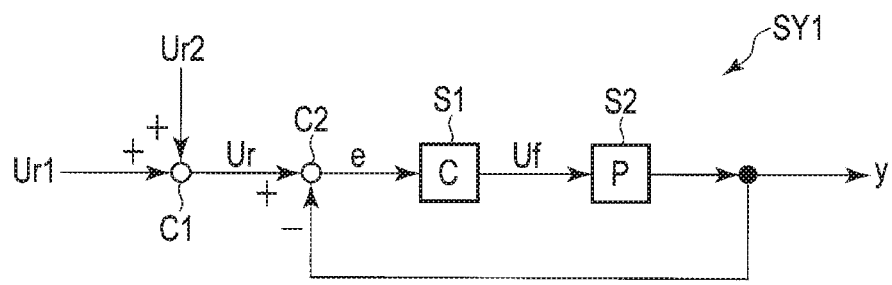
F I G. 10
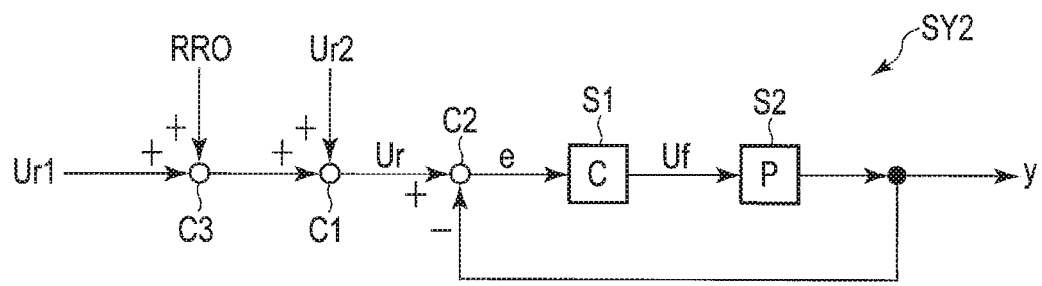
F I G. 11

| | Servo sector number | | | |
|---|---|---|---|---|
| | 0 | 1 | ... | Nsv-1 |
| Eccentric target position | Ur2 [0] | Ur2 [1] | ... | Ur2 [Nsv-1] |
| Write servo interval (current track) | Tsvw0 [0] | Tsvw0 [1] | ... | Tsvw0 [Nsv-1] |
| Write servo interval (next track) | Tsvw1 [0] | Tsvw1 [1] | ... | Tsvw1 [Nsv-1] |
TB2
F I G. 14
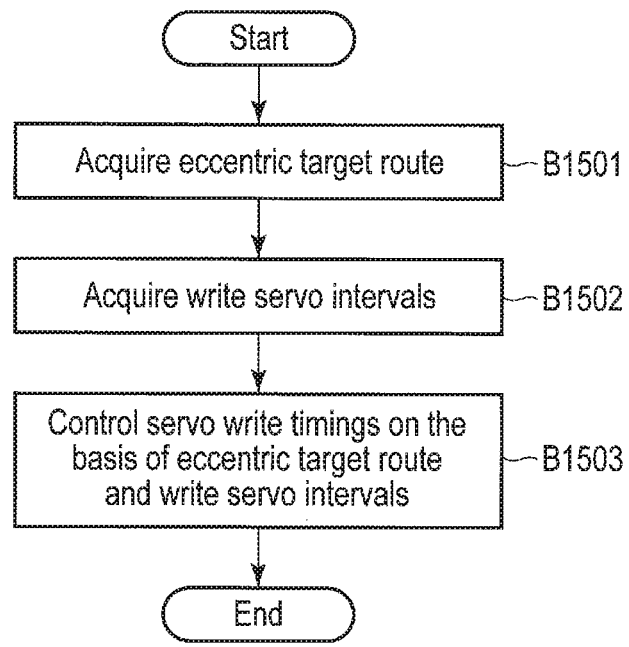
F I G. 15

| | Servo sector number | | | |
|---|---|---|---|---|
| | 0 | 1 | ... | Nsv-1 |
| Eccentric target position | Ur2 [0] | Ur2 [1] | ... | Ur2 [Nsv-1] |
| Write servo interval | Tsvw0 [0] | Tsvw0 [1] | ... | Tsvw0 [Nsv-1] |
| ⋮ | ⋮ | ⋮ | ⋮ | ⋮ |
| Write servo interval | Tsvwx [0] | Tsvwx [1] | ... | Tsvwx [Nsv-1] |
TB3
F I G. 16
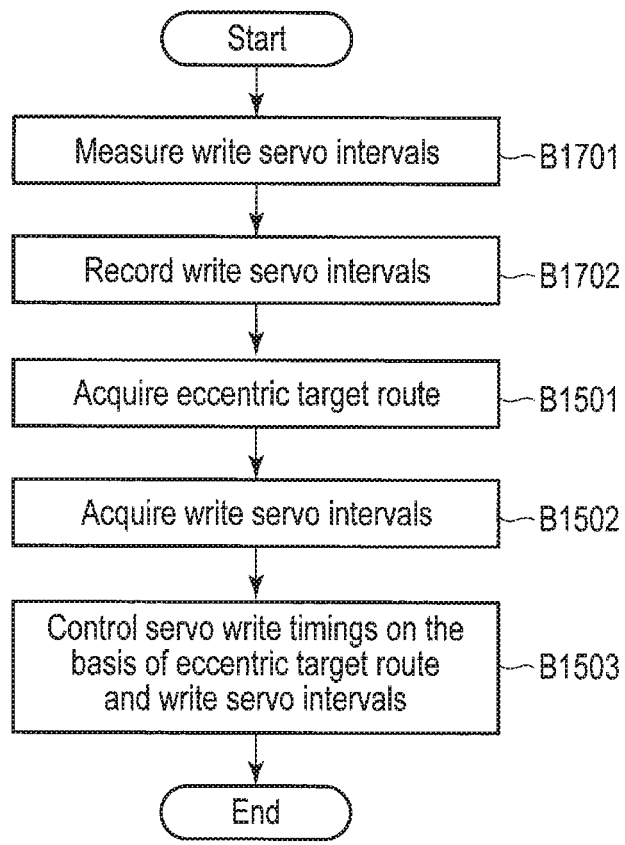
F I G. 17

MAGNETIC DISK DEVICE AND CONTROL METHOD OF SERVO WRITE

CROSS-REFERENCE TO RELATED APPLICATIONS

This application as based upon and claims the benefit of priority from Japanese Patent Application No. 2019-111239, filed Jun. 14, 2019, the entire contents of which are incorporated herein by reference.

FIELD

Embodiments described herein relate generally to a magnetic disk device and control method of servo write.

BACKGROUND

In a magnetic disk device, a plurality of servo tracks are written on a magnetic disk (hereinafter simply referred to as a disk in some cases). It is desirable in a data track (hereinafter simply referred to as a track in some cases) of the disk that intervals between a plurality servo sectors be equal to each other.

BRIEF DESCRIPTION OF THE DRAWINGS

FIG. 3 is a schematic view showing an example of the configuration of a servo sector.

FIG. 9 is a view showing an example of a change in each access servo interval of each eccentric servo sector corresponding to a particular servo track written at the servo write timing based on the change in the write servo interval shown in FIG. 8.

FIG. 10 is a block diagram showing an example of a servo control system at the time of servo write.

FIG. 11 is a block diagram showing an example of a servo control system at the time of tracking.

FIG. 12 is a flowchart showing an example of a control method of servo write according to the first embodiment.

FIG. 13 is a schematic view showing an example of a table according to a modification example 1.

FIG. 14 is a schematic view showing an example of a table according to the modification example 1.

FIG. 15 is a flowchart showing an example of a control method of servo write according to the modification example 1.

FIG. 16 is a schematic view showing an example of a table according to a modification example 2.

FIG. 17 is a flowchart showing an example of a control method of servo write according to the modification example 2.

DETAILED DESCRIPTION

In general, according to one embodiment, a magnetic disk device comprises: a disk; a head configured to write data to the disk or read data from the disk; and a controller configured to, when writing a first servo sector, a second servo sector, and a third servo sector in the order described according to a second route varying in a radial direction of the disk with respect to a first route and extending in a circumferential direction of the disk, adjust first timing used to write the second servo sector next to the first servo sector in such a manner that a first servo interval between the first servo sector and the second servo sector on the second route corresponds to a first interval between the first servo sector and the second servo sector on the first route, and adjust second timing used to write the third servo sector next to the second servo sector in such a manner that a second servo interval between the second servo sector and the third servo sector on the second route corresponds to a second interval between the second servo sector and the third servo sector on the first route.

Hereinafter, an embodiment will be described below with reference to the accompanying drawings. It should be noted that the drawings are only examples and are not to limit the scope of the invention.

First Embodiment

Figure 1:
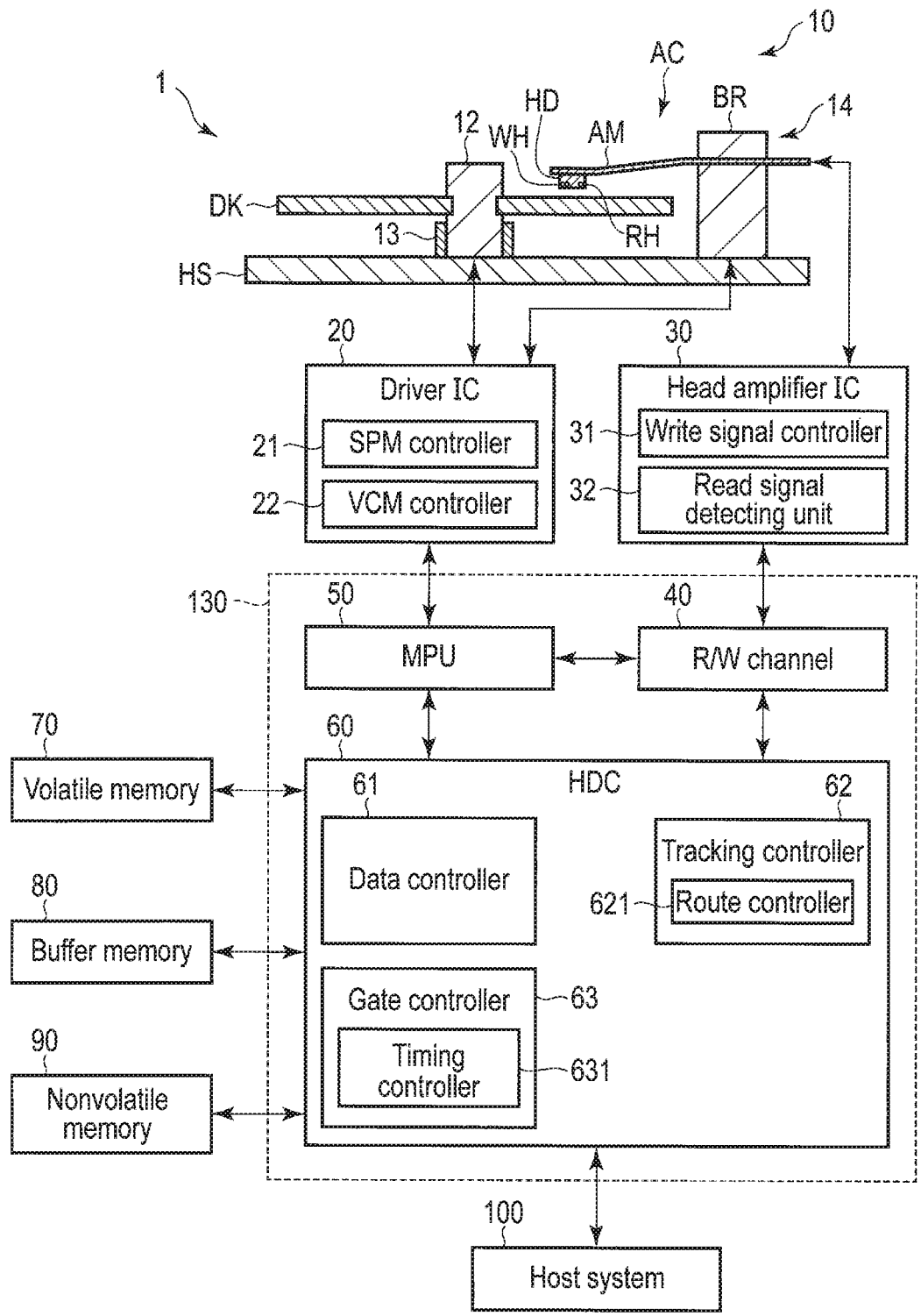
FIG. 1 is a schematic view showing an example of the configuration of a magnetic disk device according to a first embodiment.

FIG. 1 is a schematic view showing an example of the configuration of a magnetic disk device 1 according to a first embodiment.

The magnetic disk device 1 is provided with a housing HS, head disk assembly (HDA) 10, driver IC 20, head amplifier integrated circuit (hereinafter referred to as a head amplifier IC or preamplifier) 30, volatile memory 70, buffer memory (buffer) 80, nonvolatile memory 90, and system controller 130 which is a one-chip integrated circuit. Further, the magnetic disk device 1 is connected to a host system (hereinafter simply referred to as a host) 100. In FIG. 1, a cross section of the HDA 10 is shown.

The HDA 10 includes a magnetic disk (hereinafter referred to as a disk) DK, spindle motor (hereinafter referred to as an SPM) 13 configured to rotate the disk DK around a spindle 12, arm AM on which a head HD is mounted, and voice coil motor (hereinafter referred to as a VCM) 14. The SPM 13 and VCM 14 are fixed to the housing HS. The disk DK is attached to the spindle 12 and is rotated by the drive of the SPM 13. The head HD is opposed to the disk DK. The arm AM and VCM 14 constitute an actuator AC. The actuator AC revolvably (or rotatably) attached to a bearing BR vertically provided on a bottom wall of the housing HS. The VCM 14 rotates around the rotational axis of the bearing BR, whereby the actuator AC positions the head HD attached to the tip of the arm AM to a particular position of the disk DK. At least two or more disks DK and heads HD may be provided. Hereinafter, a direction along the circumference of the disk DK is referred to as a circumferential direction and direction perpendicular to the circumferential direction is referred to as a radial direction. The radial direction corresponds to a direction to the inner circumferential side or the outer circumferential side on the disk DK.

Figure 2:
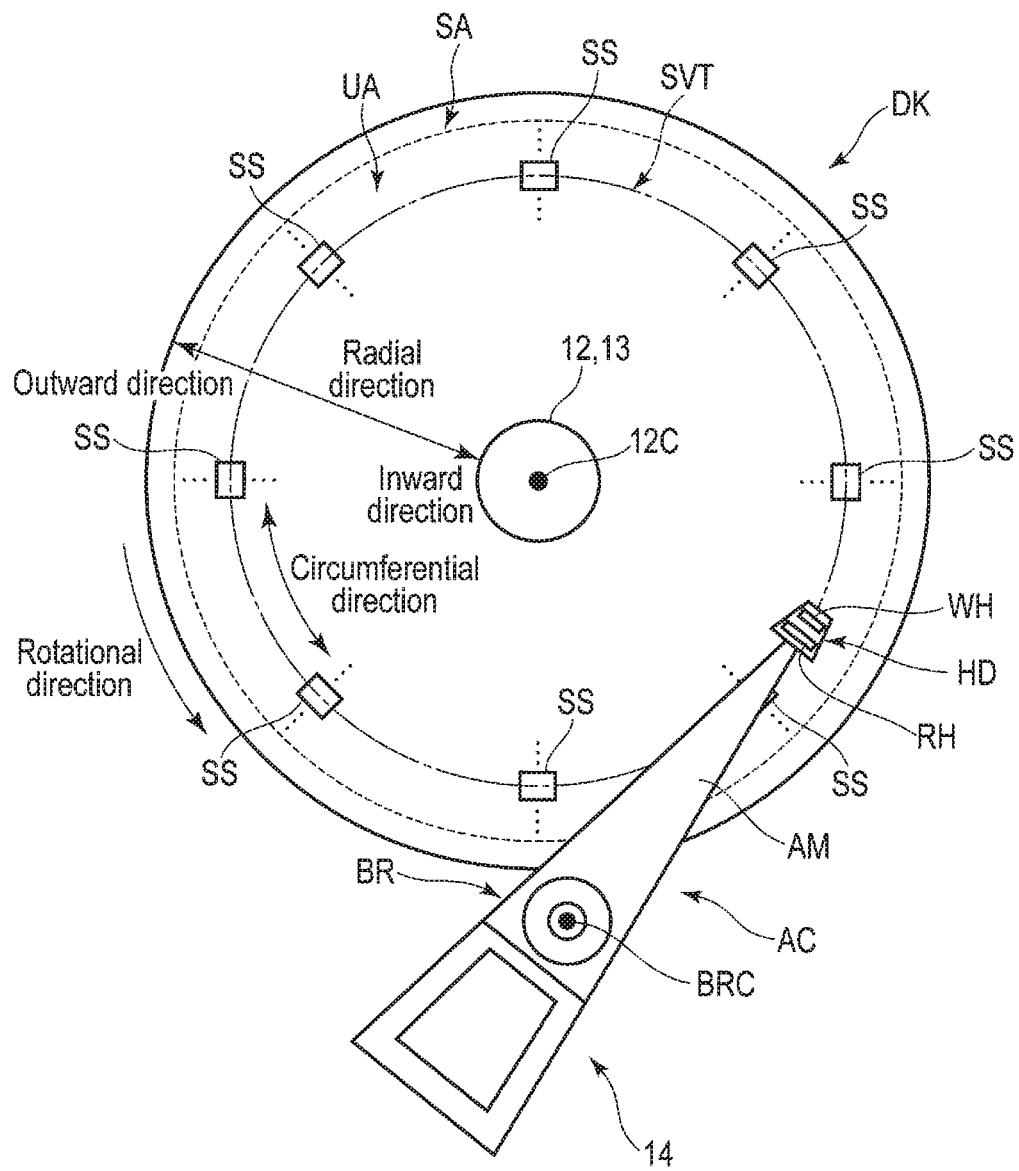
FIG. 2 is a plan view schematically showing an example of arrangement of a disk, head, and actuator.

FIG. 2 is a plan view schematically showing an example of arrangement of the disk DK, head HD, and actuator AC. As shown in FIG. 2, a direction to the outer circumference of the disk DK in the radial direction is called an outward direction (outside), and direction opposite to the outward direction is called an inward direction (inside). Further, as shown in FIG. 2, in the circumferential direction, a direction in which the disk DK rotates is called a rotational direction. It should be noted that, in the example shown in FIG. 2, although the rotational direction is indicated in a counterclockwise manner, the rotational direction may also be opposite (clockwise direction). In FIG. 2, a rotational center (hereinafter referred to as the SPM rotational center in some cases) 12C of the SPM, and rotational center (hereinafter referred to as the VCM rotational center in some cases) BRC of the VCM 14 are shown. The SPM rotational center 12C corresponds to, for example, the center of the disk DK.

In the disk DK, a user data area UA which can be utilized by the user and system area SA to which information (hereinafter referred to as system information in some cases) necessary for system management is written are assigned to an area to which data of the disk DK can be written. Hereinafter, there is sometimes a case where a particular position in the radial direction of the disk DK is called a radial position and particular position in the circumferential direction of the disk DK is called a circumferential position. There is sometimes a case where the radial position and circumferential position are collectively and simply called positions.

The disk DK includes a plurality of servo tracks SVT. In the example shown in FIG. 2, a particular servo track SVT is constituted of a plurality of servo sectors SS arranged at intervals (hereinafter referred to as servo intervals) in the circumferential direction. The particular servo track SVT may be written to the disk DK concentric with the disk DK or may be written to the disk DK in a wavelike circular form varying in the radial direction. For example, the plurality of servo sectors SS are written at equal (or regular) servo intervals in one round of the servo track SVT. The term "equal" or "regular" naturally includes the meaning of completely uniform, and further includes differing to such a degree that the differing can be regarded as being substantially identical. For example, in the user data area UA, user data can be written to an area other than an area to which servo sectors SS are written.

The head HD is provided with a write head WH and read head RH mounted on a slider in such a manner as to be opposed to the disk, the slider serving as a main body. The write head WH writes data to the disk DK. The read head RH reads data recorded on a track of the disk DK. As shown in FIG. 2, the actuator AC rotates around the VCM rotational center BRC, for example, at the time of seek, whereby the head HD slides in the horizontal plane of the disk DK. It should be noted that the term "track" is used in various senses such as data written in the circumferential direction of the disk DK, route extending in the circumferential direction of the disk DK, area extending in the circumferential direction of the disk DK, and the like. The track used to write user data, route or the like of the head HD at the time when user data is written is called a data track or simply called a track in some cases. Further, there is sometimes a case where a servo track is simply called a track or case where a data track and servo track are collectively called tracks. The track includes a plurality of sectors. A length of a track in the radial direction is called a track width. A center of the track width of the track is called a track center. There is sometimes a case where the "track center" is simply called the "track". Further, the term "sector" is used in various senses such as data written to a particular area of a track, particular position of a track, particular area of a track, and the like.

FIG. 3 is a schematic view showing an example of the configuration of a servo sector SS. In FIG. 3, a particular servo sector SS written to a particular track TRn is shown. Hereinafter, in the circumferential direction, the direction in which the head HD advances is called a traveling direction. In the example shown in FIG. 3, the traveling direction corresponds to, for example, the direction opposite to the rotational direction shown in FIG. 2.

The servo sector SS includes servo data such as a preamble, servo mark, gray code, PAD, burst data, post code, and the like. It should be noted that the servo sector SS may not include a post code. The preamble, servo mark, gray code, PAD, burst data, and post code are contiguously arranged in the servo sector SS in the traveling direction in the order described. The preamble includes preamble information configured to synchronize with a reproduced signal of the servo pattern constituted of the servo mark, gray code, and the like. The servo mark includes servo mark information indicating a commencement of the servo pattern. The gray code is constituted of an address (cylinder address) of a particular track, and address of a servo sector of the particular track. The PAD includes PAD information of a synchronizing signal of a gap, servo AGC, and the like. The burst data is data (relative position data) to be used to detect misregistration (positional error) of the head HD in the radial direction and/or the circumferential direction relative to the track center of the particular track, and is constituted of repetitive patterns of a particular period. The burst data includes, for example, an N burst and Q burst. The post code includes data (hereinafter referred to as PRO correction data) and the like configured to correct an error attributable to a deformation of the track caused by a fluctuation (repetitive runout: RHO) synchronized with the rotation of the disk DK at the time when the servo data is written to the disk. Hereinafter, for explanatory convenience, the error attributable to a deformation of the track caused by an RRO is simply called an RRO in some cases.

The driver IC 20 controls drive of the SPM 13 and VCM 14 in accordance with the control of the system controller 130 (more specifically, an MPU 50 to be described later). The driver IC 20 is provided with an SPM control section 21 and VCM control section 22. The SPM control section 21 controls rotation of the SPM 13. The VCM control section 22 controls an electric current to be supplied to the VCM 14 to thereby control the drive of the VCM 14. It should be noted that part (for example, the SPM control section 21 and VCM control section 22) of the configuration of the driver IC 20 may also be provided in the system controller 130.

The head amplifier IC (preamplifier) 30 amplifies a read signal read from the disk DK and outputs the amplified read signal to the system controller 130 (more specifically, a read/write (R/W) channel 40 to be described later). Further, the head amplifier IC 30 outputs a write current corresponding to a signal to be output from the R/W channel 40 to the head HD. The head amplifier IC 30 is provided with a write signal control section 31 and read signal detecting section 32. The write signal control section 31 controls a write current to be output to the head HD in accordance with the control of the system controller 130 (more specifically, the MPU 50 to be described later). The read signal detecting section 32 detects a signal to be written by the write head and signal read by the read head. It should be noted that part (for example, the write signal control section 31 and read signal detecting section 32) of the configuration of the head amplifier IC 30 may be provided in the system controller 130.

The volatile memory 70 is a semiconductor memory in which the stored data is lost when power supply is cut off. The volatile memory 70 stores therein data and the like necessary for the processing to be carried out by each section of the magnetic disk device 1. The volatile memory 70 is, for example, a dynamic random access memory (DRAM) or synchronous dynamic random access memory (SDRAM).

The buffer memory 80 is a semiconductor memory configured to temporarily record therein data or the like to be delivered from/to the magnetic disk device 1 to/from the host 100 by transmission/reception. It should be noted that the buffer memory 80 may be formed integral with the volatile memory 70. The buffer memory 80 is, for example, a DRAM, static random access memory (SRAM), SDRAM, ferroelectric random access memory (FeRAM), magnetoresistive random access memory (MRAM) or the like.

The nonvolatile memory 90 is a semiconductor memory configured to continue maintaining the data stored therein even when power supply thereto is cut off. The nonvolatile memory 90 is, for example, a NOR-type or NAND-type flash read only memory (FROM).

The system controller (controller) 130 is realized by using, for example, a large-scale integrated circuit (LSI) called a system-on-a-chip (SoC) in which a plurality of elements are integrated into a single chip. The system controller 130 includes a read/write (R/W) channel 40, microprocessor unit (MPU) 50, and hard disk controller (HDC) 60. The system controller 130 is electrically connected to the driver IC 20, head amplifier IC 30, volatile memory 70, buffer memory 80, nonvolatile memory 90, and host system 100. It should be noted that the system controller 130 may include the SPM control section 21, VCM control section 22, write signal control section 31, and read signal detecting section 32. Further, the system controller 130 may include the driver IC 20 and head amplifier IC 30.

The R/W channel 40 executes signal processing of read data to be transferred from the disk DK to the host 100 and write data to be transferred from the host 100 according to an instruction from the MPU 50 to be described later. The R/W channel 40 includes a circuit or function configured to measure the signal quality of read data. The R/W channel 40 is electrically connected to, for example, the head amplifier IC 30, MPU 50, HDC 60, and the like.

The MPU 50 is a main controller configured to control each unit of the magnetic disk device 1 according to an instruction from the host 100 or the like. The MPU 50 controls the actuator AC through the driver IC 20 to thereby execute servo control of carrying out positioning of the head HD. The MPU 50 controls an operation of writing data to the disk DK and selects a storage destination used to store therein the write data. Further, the MPU 50 controls an operation of reading data from the disk DK and controls processing of the read data. The MPU 50 is connected to each section of the magnetic disk device 1. The MPU 50 is electrically connected to, for example, the driver IC 20, R/W channel 40, HDC 60, and the like. Hereinafter, processing of writing write data to the disk DK is called write processing and processing of reading read data from the disk DK is called read processing.

The HDC 60 controls read/write processing according to an instruction from the MPU 50 and controls data transfer between the host 100 and R/W channel 40. The HDC 60 is electrically connected to, for example, the R/W channel 40, MPU 50, volatile memory 70, buffer memory 80, nonvolatile memory 90, and the like.

The HDC 60 is provided with a data controller 61, tracking controller 62, and gate controller 63. The HDC 60 executes processing of these sections, for example, data controller 61, tracking controller 62, gate controller 63, and the like on the firmware. It should be noted that the HDC 60 may be provided with these sections as circuits. Further, part of the configuration of the HDC 60 may be provided in the MPU 50. For example, the data controller 61, tracking controller 62, and gate controller 63 may be provided in the MPU 50.

The data controller 61 controls data to be written to the disk DK and data read from the disk DK. For example, the data controller 61 writes data to the disk DK and reads data from the disk DK.

The tracking controller 62 controls tracking of the head HD to a particular track of the disk DK. There is sometimes a case where "tracking of the head HD to a particular track of the disk DK" is simply called "tracking". The term "tracking" includes "following a particular route or particular track when writing of data to the disk DK is carried out", "following a particular route when writing of servo sectors of a particular servo track is carried out", and "following a particular route, for example, particular track when reading of data from the disk DK is carried out". The tracking controller 62 is provided with a route controller 621.

The route controller 621 controls the head HD in such a manner that the head HD follows a particular route of the disk DK. When executing write processing or read processing, the route controller 621 controls the head HD in such a manner that the head HD follows a particular route, for example, particular track. When writing a servo track (servo sectors or servo data) corresponding to a particular track to the disk DK, the route controller 621 controls the head HD in such a manner that the head HD follows a route (hereinafter referred to as an eccentric target route) to be formed by shifting a targeted radial position (hereinafter referred to as a target radial position) in the radial direction by a particular amount of deviation (hereinafter referred to as an amount of eccentricity) at each circumferential position of a targeted route (hereinafter referred to as a target route), for example, targeted track (hereinafter referred to as a target track). Hereinafter, "writing a servo track (servo data) to the disk DK" is referred to as "servo write". Hereinafter, "writing servo data" is referred to as "writing a servo sector" in some cases. Further, an amount of eccentricity is indicated by δ in some cases. For example, the route controller 621 calculates a position (hereinafter referred to as an eccentric target position) to be obtained by adding an amount of eccentricity to a target radial position for each servo sector on a particular track, and calculates an eccentric target route on the basis of the eccentric target positions calculated at the servo sectors of the particular servo track. The target route corresponds to, for example, a circular route concentric with the disk DK. The route controller 621 calculates an eccentric target route by using a formula derived on the basis of the arrangement of, for example, the SPM 13 (spindle 12), bearing BR, and head HD (for example, the read head RH or write head WH). When tracking or accessing a particular user data track to be used to read or write user data by controlling the position of the head HD on the basis of, for example, servo data (servo track), the route controller 621 controls the head HD in such a manner that the head HD follows the target route. Here, the term "accessing" includes "writing data to the disk DK", "writing servo sectors of a particular servo track", "reading data from the disk DK", "reading servo sectors", and the like. Hereinafter, "controlling the position of the head HD on the basis of servo data (servo track)" is called "servo control". It should be noted that the route controller 621 may acquire an eccentric target route calculated for each track or zone from a table recorded in a particular storage area, for example, the buffer memory 80, nonvolatile memory 90 or system area SA. The route controller 621 may control the head HD in such a manner that the head HD follows the target route at the time of servo write. Further, in the case of tracking a particular track by servo control or in the case of accessing a particular track by servo control, the route controller 621 may control the head HD in such a manner that the head HD follows the eccentric target route.

Figure 4:
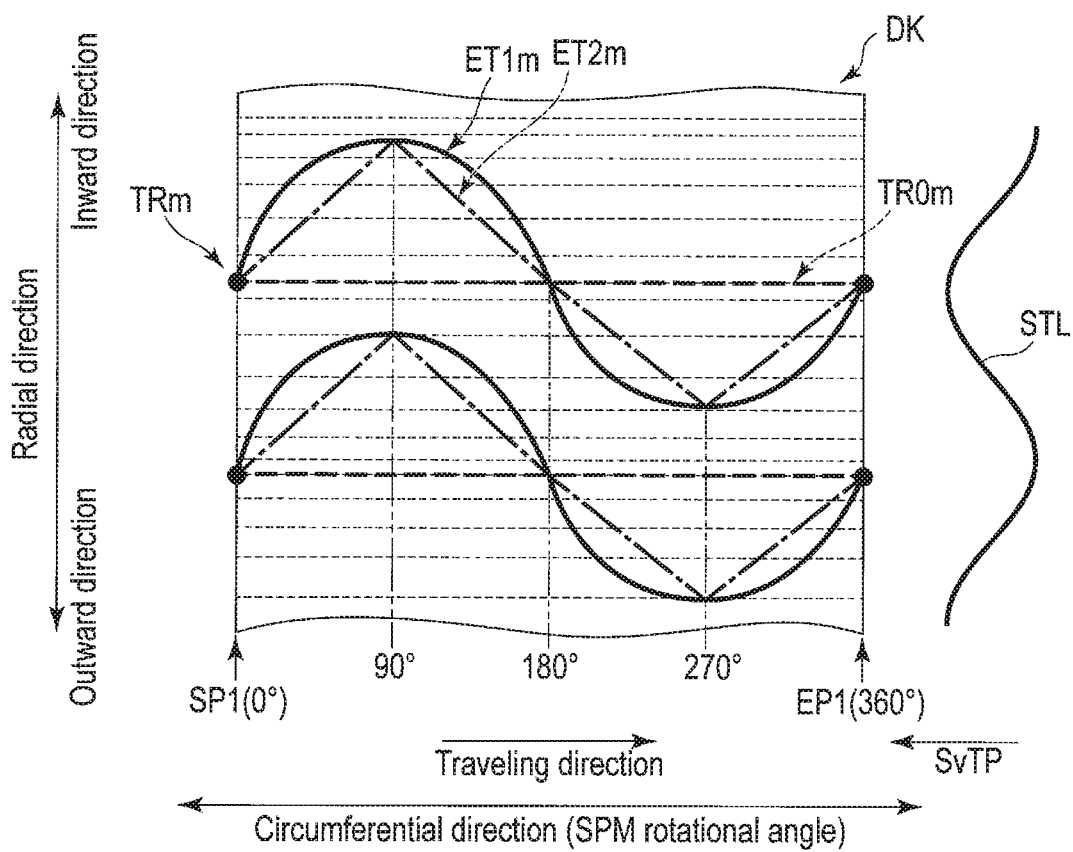
FIG. 4 is a view showing examples of eccentric target routes.

FIG. 4 is a view showing an example of each of eccentric target routes ET1*m* and ET2*m*. In FIG. 4, the axis of abscissa indicates the circumferential direction and rotational angle (hereinafter referred to as an SPM rotational angle) of the SPM 14, and axis of ordinate indicates the radial direction. Hereinafter, the SPM rotational angle is indicated by $\varphi$ in some cases. In FIG. 4, a plurality of servo tracks (track centers of servo tracks) arranged at intervals (track pitches) in the radial direction are indicated by broken lines. Although each track is defined by a straight line in FIG. 4, actually each track can be defined by a circular line making a round on the disk DK. Further, although each track linearly extends in the circumferential direction in FIG. 4, each track may extend in a wavy form which varies in the radial direction while extending in the circumferential direction. In FIG. 4, one servo track TRm which is one of a plurality of servo tracks arranged at intervals in the radial direction is shown. In FIG. 4, a change STL in the track pitch of the plurality of servo tracks arranged in the radial direction is shown. In the example shown in FIG. 4, the track pitch changes in the radial direction as indicated by the change STL in the track pitch. The axis of abscissa in FIG. 4 indicates circumferential positions SP1 and EP1. In the example shown in FIG. 4, the circumferential position SP1 corresponds to a circumferential position (hereinafter referred to as a starting position) at which tracking of servo write corresponding to the servo track TRm or tracking of the servo track TRm is started. The circumferential position EP1 corresponds to a circumferential position (hereinafter referred to as an ending position) at which tracking of servo write corresponding to the servo track TRm or tracking of the servo track TRm is ended. In the example shown in FIG. 4, although the servo track TRm extends from the starting position SP1 to the ending position EP1, actually the servo track TRm makes a round of the disk DK. That is, the starting position SP1 and ending position EP1 are coincident with each other. The axis of abscissa in FIG. 4 indicates SPM rotational angles $\varphi$ (=0°, 90°, 180°, 270°, and 360°). In the example shown in FIG. 4, the SPM rotational angle $\varphi$ (=0°) corresponds to the starting position SP1 and SPM rotational angle $\varphi$ (=360°) corresponds to the ending position EP1. In FIG. 4, a target route TROm corresponding to the servo track TRm, eccentric target route ET1*m* corresponding to the servo track TRm, and eccentric target route ET2*m* corresponding to the servo track TRm are shown. The eccentric target route ET1*m* corresponds to a route formed by adding a sinusoidal waveform to the target route TROm as an amount of deviation. The eccentric target route ET1*m* is defined by a first-order sinusoidal waveform which extends from the starting position SP1 to the ending position EP1 while lying astride several tracks. A closed route (orbit) such as the eccentric target route ET1*m* which makes a round of the disk DK and in which the starting position and ending position are coincident with each other is called a virtual circular orbit in some cases. The eccentric target route ET2*m* corresponds to a route formed by adding a triangular waveform to the target route TROm as an amount of deviation. The eccentric target route ET2*m* is defined by a triangular waveform which extends from the starting position SP1 to the ending position EP1 while lying astride several tracks. It should be noted that in the example shown in FIG. 4, although the eccentric target route is a route corresponding to a sinusoidal waveform or triangular waveform in which one round of the disk DK corresponds one period, the eccentric target route may be a route corresponding to a sinusoidal waveform or triangular waveform in which one round of the disk DK corresponds to two periods or more.

In the example shown in FIG. 4, the route controller 621 controls the head HD in such a manner that the head HD follows the eccentric target route ET1*m* or ET2*m* at the time of servo write. Hereinafter, a description will be given assuming that the route controller 621 controls the head HD in such a manner that the head HD follows the eccentric target route ET1*m* at the time of servo write. The head HD is controlled in such a manner that the head HD follows the eccentric target route ET1*m* or ET2*m*, whereby the head HD lies astride a plurality of servo tracks at the time of accessing the user data track, and hence an adverse influence caused by changes in the track pitch of the plurality of servo tracks arranged in the radial direction such as oscillation in the servo control or interference between tracks adjacent to each other in the radial direction is reduced.

Figure 5A:
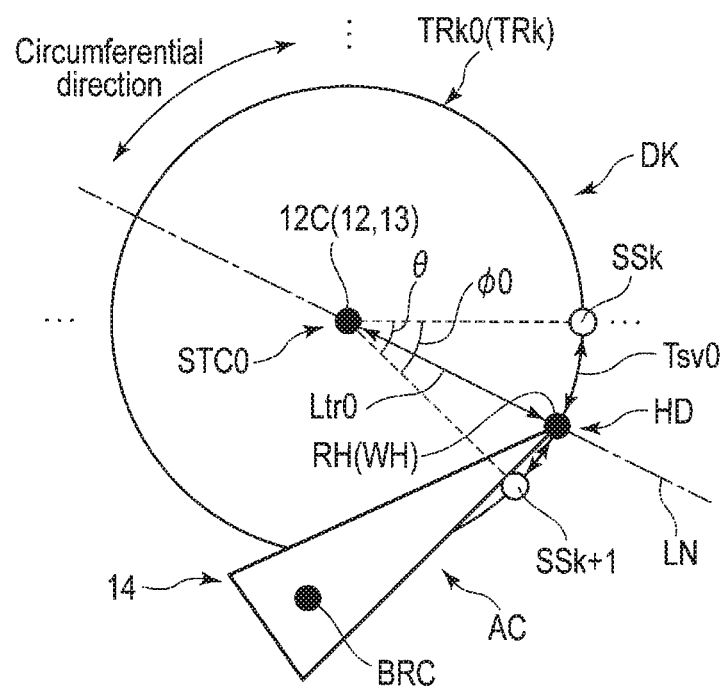
FIG. 5A is a schematic view showing an example of arrangement of an SPM, VCM, and head.
Figure 5B:
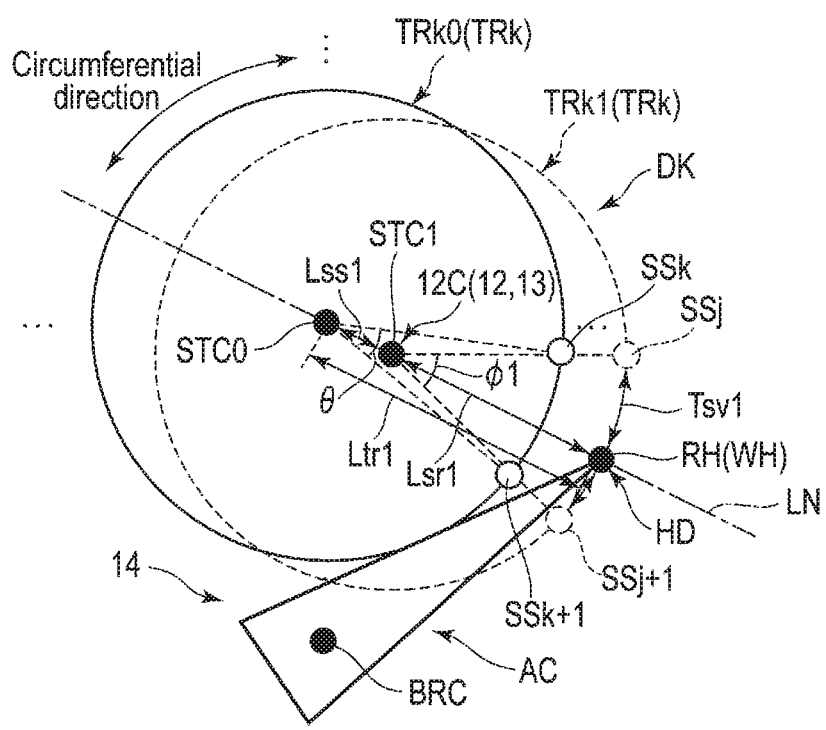
FIG. 5B is a schematic view showing an example of arrangement of an SPM, VCM, and head.
Figure 5C:
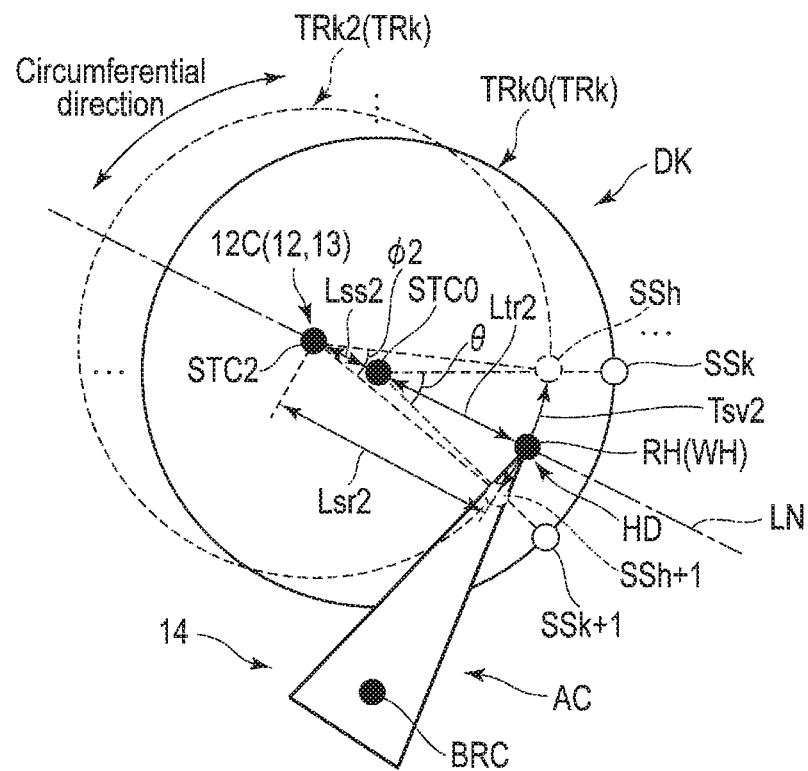
FIG. 5C is a schematic view showing an example of arrangement of an SPM, VCM, and head.

Each of FIG. 5A, FIG. 5B, and FIG. 5C is a schematic view showing an example of arrangement of the SPM 13, VCM 14, and head HD. For example, each of FIGS. 5A to 5C shows an example of arrangement of the head HD configured to follow a particular eccentric target route TRk which is a virtual circular orbit, SPM 13, and VCM 14. In each of FIGS. 5A to 5C, a route TRk0 corresponding to the eccentric target route TRk is shown. In each of FIGS. 5A to 5C, the route TRk0 corresponds a target route corresponding to, for example, the eccentric target route TRk. In each of FIGS. 5A to 5C, the center STC0 of the route TRk0 is shown. In each of FIGS. 5A to 5C, the SPM rotational center 12C, read head RH (or write head WH), and VCM rotational center BRC are shown. In each of FIGS. 5A to 5C, an alternate long and short dash line LN passing through the SPM rotational center 12C and read head RH (or write head WH) is shown. In each of FIGS. 5A to 5C, two servo sectors SSk and SSk+1 adjacent to each other in the circumferential direction on the route TRk0 are shown. In each of FIGS. 5A to 5C, an angle $\theta$ (hereinafter referred to as a servo angle) around the center STC0 of the route TRk0 corresponding to the distance (servo interval) from the servo sector SSk to the servo sector SSk+1 is shown.

FIG. 5A shows an example of arrangement of the head HD, SPM 13, and VCM 14 of a case where the arrangement is not eccentric to the route TRk0. In FIG. 5A, the center STC0 of the route TRk0 corresponds to the SPM rotational center 12C. In FIG. 5A, the read head RH (or write head WH) is positioned on the route TRk0. In FIG. 5A, the SPM rotational angle $\varphi 0$ around the SPM rotational center 12C corresponding to the servo interval Tsv0 from the servo sector SSk to the servo sector SSk+1 is equal to the servo angle $\theta$.

FIG. 5B shows an example of arrangement of the head HD, SPM 13, and VCM 14 of a case where the arrangement is eccentric to the route TRk0. In FIG. 5B, a route TRk1 corresponding to the eccentric target route TRk is shown. The route TRk1 corresponds to a route formed by shifting the route TRk0 in the radial direction by a particular amount of eccentricity. The diameter of the route TRk1 is equivalent to the diameter of the route TRk0. In FIG. 5B, the center STC1 of the route TRk1 is shown. In FIG. 5B, the center STC1 of the route TRk1 corresponds to the SPM rotational center 12C. In FIG. 5B, the center STC1 of the route TRk1 and center STC0 of the route TRk0 are separate from each other by a distance Lss1. In FIG. 5B, the distance Lss1 corresponds to the amount of eccentricity. In FIG. 5B, the read head RH (or write head WH) is positioned on the route TRk1. The center STC1 of the route TRk1 and read head RH (or write head WH) are separate from each other by a distance Lsr1. In FIG. 5B, a distance (hereinafter referred to as a head separation distance in some cases) Ltr between the center STC0 of the route TRk0 and read head RH (or write head WH) corresponds to a distance Ltr1. The distance Ltr1 corresponds to, for example, the maximum value of the head separation distance Ltr on the eccentric target route TRk. In FIG. 5B, two servo sectors SSj and SSj+1 adjacent to each other in the circumferential direction on the route TRk1 are shown. The servo sector SSj is positioned in the outward direction from the servo sector SSk and is positioned on a straight line passing through the SPM rotational center 12C and servo sector SSk. The servo sector SSj+1 is positioned in the outward direction from the servo sector SSk+1 and is positioned on a straight line passing through the SPM rotational center 12C and servo sector SSk+1. In FIG. 5B, the SPM rotational angle φ1 around the center STC1 corresponding to the servo interval Tsv1 from the servo sector SSj to the servo sector SSj+1 is shown.

FIG. 5C shows an example of arrangement of the head HD, SPM 13, and VCM 14 of a case where the arrangement is eccentric to the target route TRk0. In FIG. 5C, a route TRk2 corresponding to the track TRk is shown. The route TRk2 corresponds to a route formed by shifting the route TRk0 in the radial direction and in a direction opposite to the route TRk1 by a particular amount of eccentricity. The diameter of the route TRk2 is equivalent to the diameter of the route TRk0. In FIG. 5C, the center STC2 of the route TRk2 is shown. In FIG. 5C, the center STC2 of the route TRk2 corresponds to the SPM rotational center 12C. In FIG. 5C, the center STC2 of the route TRk2 and center STC0 of the route TRk0 are separate from each other by a distance Lss2. In FIG. 5C, the distance Lss2 corresponds to the amount of eccentricity. For example, an absolute value of the distance Lss2 is equivalent to an absolute value of the distance LSS1. In FIG. 5C, the read head RH (or write head WH) is positioned on the route TRk2. The center STC2 of the route TRk2 and read head RH (or write head WH) are separate from each other by a distance Lsr2. In FIG. 5C, the head separation distance Ltr is the distance Ltr2. The distance Ltr2 corresponds to, for example, the minimum value of the head separation distance Ltr on the eccentric target route TRk. In FIG. 5C, two servo sectors SSh and SSh+1 adjacent to each other in the circumferential direction on the route TRk2 are shown. The servo sector SSh is positioned in the inward direction from the servo sector SSk and is positioned on a straight line passing through the SPM rotational center 12C and servo sector SSk. The servo sector SSh+1 is positioned in the inward direction from the servo sector SSk+1 and is positioned on a straight line passing through the SPM rotational center 12C and servo sector SSk+1. In FIG. 5C, the SPM rotational angle φ2 around the center STC2 corresponding to the servo interval Tsv2 from the servo sector SSh to the servo sector SSh+1 is shown.

Hereinafter, the distance from the SPM rotational center 12C to the read head RH (or write head WH) is set as r ($\approx$Lsr1$\approx$Lsr2), and amount of eccentricity is set as δ (=|Lss1|=|Lss2|). Hereinafter, the distance r is called a head radial distance r in some cases.

From the example shown in FIG. 5B, the following equation of the circular arc is derived.

$$r\varphi 1=(r+\delta)\theta \qquad \text{formula (1)}$$

From the example shown in FIG. 5C, the following equation of the circular arc is derived.

$$(r-\delta)\theta=r\varphi 2 \qquad \text{formula (2)}$$

From the examples shown in FIG. 5B and FIG. 5C, the following relational expression between the servo interval and SPM rotational angle is derived.

$$\frac{Tsv1}{Tsv2}=\frac{\varphi 1}{\varphi 2} \qquad \text{formula (3)}$$

From the formulas (1) to (3) described previously, the amount of eccentricity δ is expressed by the following formulas.

$$\delta = \frac{Tsv1-Tsv2}{Tsv1+Tsv2}r = \frac{\Delta Top}{Tave}r \qquad \text{formula (4)}$$

$$\Delta Top = \frac{\delta}{r}Tave \qquad \text{formula (5)}$$

Here, Tave indicates an average value of servo intervals of a plurality of servo tracks astride which the head HD lies when a particular track is written, when servo sectors of a particular servo track are written, when tracking of a particular tack is carried out or when tracking of a particular servo track is carried out. For example, Tave is expressed as follows.

Tave=60/(revolution per minute or rotations per minute: RPM)/Nsv

Nsv is the number of servo sectors included in one round of a particular track. δTop corresponds to half a peak-to-peak value of the amplitude in the change in the servo interval of a plurality of servo tracks astride which the head HD lies when a particular track is written, when servo sectors of a particular servo track are written, when tracking of a particular track is carried out or when tracking of a particular servo track is carried out.

The eccentric target position Ur2 obtained by adding a first-order sinusoidal waveform to a target route of a particular track as an amount of deviation is expressed by the following formula.

$$Ur2=\delta \sin \varphi \qquad \text{formula (6)}$$

The route controller 621 calculates the eccentric target route on the basis of the formula (6).

Figure 6:
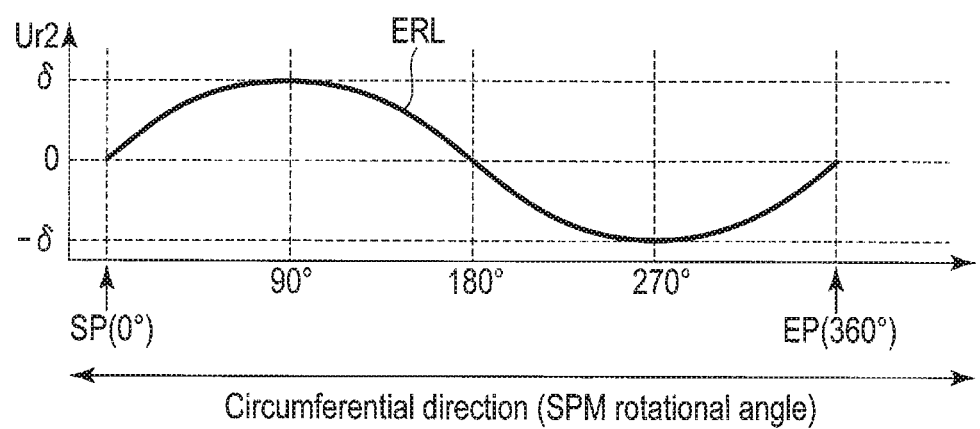
FIG. 6 is a view showing an example of an eccentric target route.

FIG. 6 is a view showing an example of an eccentric target route ERL. In FIG. 6, the eccentric target route ERL is shown. In FIG. 6, the axis of abscissa indicates the circumferential direction and SPM rotational angle, and axis of ordinate indicates the eccentric target position Ur2. The axis of abscissa of FIG. 6 indicates the circumferential positions SP and EP. In the example shown in FIG. 6, the circumferential position SP corresponds to the starting position of the eccentric target route ERL, and circumferential position EP corresponds to the ending position of the eccentric target route ERL. The axis of abscissa of FIG. 6 indicates SPM rotational angles φ (=0°, 90°, 180°, 270°, and 360°). In the example shown in FIG. 6, the SPM rotational angle φ (=0°) corresponds to the starting position SP and SPM rotational angle φ (=360°) corresponds to the ending position EP. The axis of ordinate of FIG. 6 indicates the eccentric target positions Ur2 (=δ) and Ur2 (=−δ). Here, δ corresponds to the amount of eccentricity. Further, the absolute value of δ and absolute value of −δ are identical to each other.

In the example shown in FIG. 6, at the time of servo write, the route controller 621 calculates the eccentric target position Ur2 at each circumferential position on the basis of formula (6), calculates the eccentric target route ERL on the basis of the eccentric target position Ur2 at each circumferential position, and controls the head HD on the basis of the calculated eccentric target route ERL.

Figure 7:
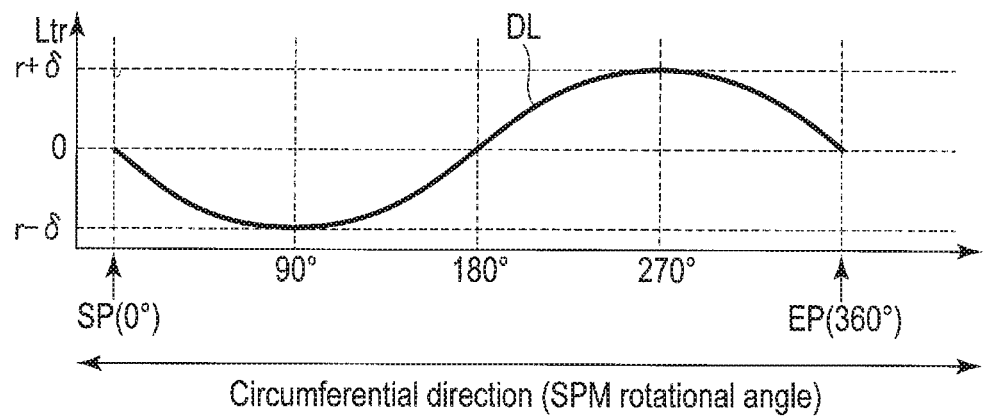
FIG. 7 is a view showing an example of a change in the distance between a center of a route corresponding to the eccentric target route shown in FIG. 6 and head.

FIG. 7 is a view showing an example of a change DL in the head separation distance Ltr between the center STC0 of the route TRk0 corresponding to the eccentric target route ERL shown in FIG. 6 and head HD. In FIG. 7, a change DL (hereinafter simply called a change DL in the head separation distance Ltr in some cases) in the head separation distance Ltr between the center STC0 of the route TRk0 corresponding to the eccentric target route ERL shown in FIG. 6 and head HD (read head RH or write head WH) in the circumferential direction is shown. In FIG. 7, the axis of abscissa indicates the circumferential direction and SPM rotational angle, and axis of ordinate indicates the head separation distance Ltr between the center STC0 of the route TRk0 and read head RH (or write head WH). The axis of abscissa of FIG. 7 indicates the starting position SP corresponding to the eccentric target route ERL shown in FIG. 6 and ending position EP corresponding to the eccentric target route ERL shown in FIG. 6. The axis of abscissa of FIG. 7 indicates SPM rotational angles φ (=0°, 90°, 180°, 270°, and 360°). The SPM rotational angle φ (=0°) corresponds to the starting position SP and SPM rotational angle φ (=360°) corresponds to the ending position EP. The axis of ordinate of FIG. 7 indicates the head separation distance Ltr (=r+δ) obtained by adding the amount of eccentricity δ to the head radial distance r and head separation distance Ltr (=r−δ) obtained by subtracting the amount of eccentricity δ from the head radial distance r.

When the route controller 621 controls the head HD on the basis of the eccentric target route ERL shown in FIG. 6 at the time of servo write, the head separation distance Ltr changes in one round of the disk DK as the change DL in the head separation distance Ltr shown in FIG. 7.

The gate controller 63 controls the gate signal. The gate controller 63 is provided with a timing controller 631.

The timing controller 631 controls the timing of a gate signal for writing data and timing of a gate signal for reading data. For example, the timing controller 631 controls the timing (hereinafter referred to as servo write timing in some cases) of a gate signal (hereinafter referred to as a servo write gate) for writing servo data (servo sector) and timing (hereinafter referred to as access timing in some cases) of a gate signal used to control the head HD in such a manner that the head HD follows a particular route, for example, a target route to thereby access data. When writing a particular track, for example, particular servo track according to an eccentric target route, the timing controller 631 controls the servo write timings for writing the servo sectors according to the eccentric target route corresponding to the servo track in such a manner that the servo intervals of the servo sectors corresponding to the servo track correspond to the servo intervals of the servo sectors at the time when the servo track is accessed or tracked according to the target route. For example, the timing controller 631 writes servo sectors corresponding to a particular servo track on the basis of an eccentric target route corresponding to the particular servo track and, thereafter when accessing or tracking the servo sectors according to the target route, the timing controller 631 controls the servo write timings for writing the servo sectors according to the eccentric target route in such a manner that the servo intervals and access timings of the servo sectors become equal within one round of the target route. In other words, the timing controller 631 writes servo sectors corresponding to a particular servo track on the basis of an eccentric target route corresponding to the servo track and, thereafter when writing servo sectors according to the eccentric target route, the timing controller 631 adjusts the circumferential positions of the servo sectors in such a manner that the servo intervals and access timings of the servo sectors at the time when the servo sectors are accessed or tracked according to the target route become equal within one round of the target route.

Hereinafter, a "servo sector written on the basis of an eccentric target route" is called an "eccentric servo sector" or "eccentric servo data". An "interval between an eccentric servo sector currently being written and eccentric servo sector to be written next to the eccentric servo sector currently being written" is called a "write servo interval". Further, "servo intervals of eccentric servo sectors at the time when the eccentric servo sectors are accessed according to a target route after the eccentric servo sectors are written" are called "access servo interval" in some cases. The timing controller 631 calculates write servo intervals of the eccentric servo sectors in such a manner that the write servo intervals correspond to the access servo intervals of the eccentric servo sectors on a particular servo track and controls the servo write timings for writing the eccentric servo sectors corresponding to the aforementioned servo track on the basis of the calculated write servo intervals. For example, the timing controller 631 calculates write servo intervals of the eccentric servo sectors at the time of write in such a manner that the access servo intervals and access timings of the eccentric servo sectors corresponding to a particular servo track become equal within one round of the target route, and controls the servo write timings for writing the eccentric servo sectors corresponding to the servo track on the basis of the calculated write servo intervals. In other words, when carrying out write in such a manner that access servo intervals and access timings of eccentric servo sectors corresponding to a particular servo track become equal within one round of the target route, the timing controller 631 adjusts the circumferential positions of the eccentric servo sectors, and controls the servo write timings for writing the eccentric servo sectors corresponding to the aforementioned servo track on the basis of the adjusted circumferential positions of the eccentric servo sectors for write. That is, the timing controller 631 adjusts the write servo interval of the eccentric servo sectors in such a manner that the access servo intervals and access timings of the eccentric servo sectors corresponding to the particular servo track become equal within one round of the target route. It should be noted that the timing controller 631 may calculate write servo intervals of the eccentric servo sectors at the time of write in such a manner that at least one of the two items including the access servo intervals and access timings of the eccentric servo sectors corresponding to the particular servo track becomes equal within one round of the target route, and may control the servo write timings for writing the eccentric servo sector corresponding to the aforementioned servo track on the basis of the calculated write servo intervals. The timing controller 631 calculates the write servo intervals Tsvw of the eccentric servo sectors on the basis of the following formula to be derived on the basis of, for example, the arrangement of the SPM 13, VCM 14, and head HD and formula (6).

$$Tsvw = \left(1 + \frac{\delta}{r}\sin\varphi\right)Tave \qquad \text{formula (7)}$$

The timing controller 631 controls the servo write timings for writing the eccentric servo sectors on the basis of, for example, the write servo interval Tsvw of the eccentric servo sectors calculated by using the formula (7). A write servo interval (hereinafter referred to as a first write servo interval) between a particular eccentric servo sector (hereinafter referred to as a first eccentric servo sector) calculated by using, for example, the formula (7) and eccentric servo sector (hereinafter referred to as a second eccentric servo sector) to be written next to the first eccentric servo sector and write servo interval (hereinafter referred to as a second write servo interval) between the first eccentric servo sector and eccentric servo sector (hereinafter referred to as a third eccentric servo sector) to be written next to the second eccentric servo sector are different from each other.

Figure 8:
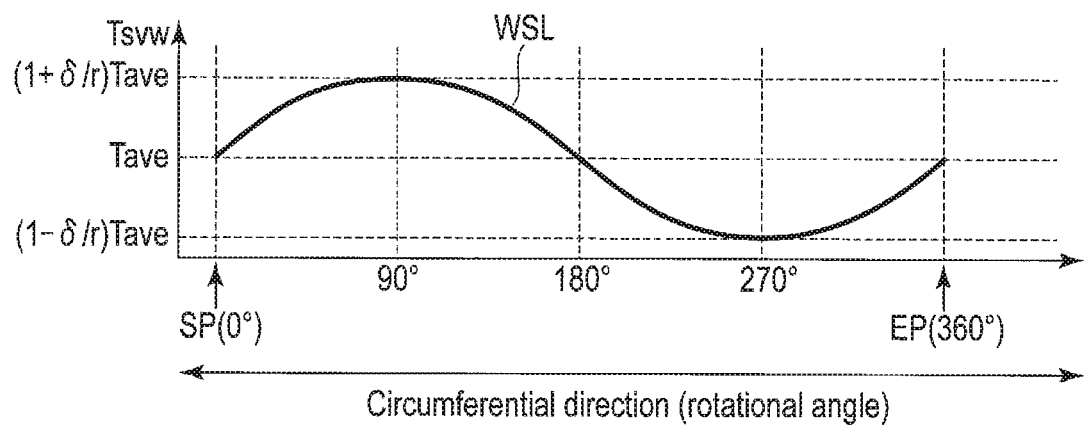
FIG. 8 is a view showing an example of a change in the write servo interval of a case where the servo track is written according to the eccentric route shown in FIG. 6.

FIG. 8 is a view showing an example of a change WSL in the write servo interval Tsvw of a case where servo write is carried out according to the eccentric target route ERL shown in FIG. 6. In FIG. 8, a change WSL (hereinafter simply referred to as a change WSL in the write servo interval Tsvw in some cases) in the write servo interval Tsvw in the circumferential direction of a case where the eccentric servo sectors corresponding to a particular servo track is written by following the eccentric target route ERL shown in FIG. 6 by using the head HD is shown. In FIG. 8, the axis of abscissa indicates the circumferential direction and SPM rotational angle, and axis of ordinate indicates the write servo interval Tsvw. The axis of abscissa of FIG. 3 indicates the starting position SP corresponding to the eccentric target route ERL shown in FIG. 6 and ending position EP corresponding to the eccentric target route ERL shown in FIG. 6. The axis of abscissa in FIG. 8 indicates SPM rotational angles φ (=0°, 90°, 180°, 270°, and 360°). The SPM rotational angle φ (=0°) corresponds the starting position SP and SPM rotational angle φ (=360°) corresponds to the ending position EP. The axis of ordinate in FIG. 8 indicates the write servo intervals Tsvw (=(1−δ/r)×Tave, Tave, and (1+δ/r)×Tave).

The timing controller 631 calculates the write servo intervals Tsvw of the eccentric servo sectors corresponding to the particular servo track on the basis of formula (7), acquires a change WSL in the write servo interval Tsvw from the calculated write servo intervals Tsvw of the eccentric servo sectors, and controls the servo write timings for writing the eccentric servo sectors corresponding to the aforementioned servo track on the basis of the acquired change WSL in the write servo interval Tsvw in such a manner that the access servo intervals and access timings of the eccentric servo sectors become equal within one round of the target route. For example, when the servo write timings for writing the eccentric servo sectors corresponding to the particular servo track is adjusted on the basis of the change WSL in the write servo interval Tsvw in such a manner that the access servo intervals and access timings of the eccentric servo sectors of the servo track become equal within one round of the target route, the servo write timings change in the eccentric servo sectors. In one example, when the servo write timings for writing the eccentric servo sectors corresponding to the particular servo track are adjusted on the basis of the change WSL in the write servo interval Tsvw in such a manner that the access servo intervals and access timings of the eccentric servo sectors of the aforementioned servo track become equal within one round of the target route, the servo write timing (hereinafter referred to as a first servo write timing) for writing the second eccentric servo sector next to the first eccentric servo sector and servo write timing (hereinafter referred to as a second servo write timing) for writing the third eccentric servo sector next to the second eccentric servo sector are different from each other.

FIG. 9 is a view showing an example of a change ASL in the access servo interval Tsv of the eccentric servo sector corresponding to a particular servo track written at the servo write timing based on the change WSL in the write servo interval Tsvw shown in FIG. 8. In FIG. 9, a change ASL (hereinafter simply referred to as a change ASL in the servo interval Tsv in some cases) in the circumferential direction in the access servo interval Tsv of the eccentric servo sector corresponding to a particular servo track written at the servo write timing based on the change WSL in the write servo interval Tsvw shown in FIG. 8 is shown. In FIG. 9, the axis of abscissa indicates the circumferential direction and SPM rotational angle, and axis of ordinate indicates the access servo interval Tsv. The axis of abscissa of FIG. 9 indicates the starting position SP corresponding to the eccentric target route ERL shown in FIG. 6 and ending position EP corresponding to the eccentric target route ERL shown in FIG. 6. The axis of abscissa in FIG. 9 indicates SPM rotational angles φ (=0°, 90°, 180°, 270°, and 360°). The SPM rotational angle φ (=0°) corresponds to the starting position SP and SPM rotational angle φ (=360°) corresponds to the ending position EP. The axis of ordinate in FIG. 9 indicates the write servo intervals Tsvw (=(1−δ/r)×Tave, Tave, and (1+δ/r)×Tave).

The timing controller 631 controls the access timings of the eccentric servo sectors on the basis of the change ASL in the access servo interval Tsv at the time when the eccentric servo sectors corresponding to a particular servo track servo-written at the servo write timing based on the change WSL in the write servo interval Tsvw shown in FIG. 8 is accessed according to the target route. In the example shown in FIG. 9, the timing controller 631 controls the access timing in such a manner as to access the eccentric servo sectors corresponding to the particular servo tack at equal access servo intervals and at equal timings on the basis of the change ASL in the access servo interval Tsv equal (or even) in the circumferential direction.

FIG. 10 is a block diagram showing an example of a servo control system SY1 at the time of servo write.

The magnetic disk device 1 includes a servo control system SY1 at the time of servo write. The servo control system SY1 includes a controller S1, actuator S2, computing unit C1, and computing unit C2. The controller S1 is included in, for example, the system controller 130. The actuator S2 is included in, for example, the actuator AC.

The controller S1 controls the actuator S2. The controller S1 creates a drive amount Uf of the actuator S2 on the basis of, for example, a positioning error e. It should be noted that the controller S1 may create the drive amount Uf on the basis of a value other than the positioning error e.

The actuator S2 carries out drive according to an output of the controller S1. The actuator S2 carries out drive on the basis of, for example, the drive amount Uf, and moves the head HD to an actual position (hereinafter referred to as an actual position) y at which access is carried out.

The target radial position Ur1 and eccentric target position Ur2 are input to the computing unit C1. The computing unit C1 outputs an objective position Ur obtained by adding the eccentric target position Ur2 to the target radial position Ur1 to the computing unit C2. To the computing unit C2, the actual position y and objective position Ur are input. The computing unit C2 outputs a positioning error e obtained by subtracting the actual position y from the objective position Ur to the controller S1. To the controller S1, the positioning error e is input. The controller S1 outputs a drive amount Uf to the actuator S2. To the actuator S2, the drive amount Uf is input. The actuator S2 carries out drive according to the drive amount Uf, and moves the head HD to the actual position y corresponding to the drive amount Uf. The actuator S2 outputs the actual position y to the computing unit C2.

FIG. 11 is a block diagram showing an example of a servo control system SY2 at the time of tracking.

The magnetic disk device 1 includes the servo control system SY2 at the time of tracking. The servo control system SY2 includes a controller S1, actuator S2, computing unit C1, computing unit C2, and computing unit C3.

A target radial position Ur1 and RRO are input to the computing unit C3. The computing unit C3 outputs a value obtained by adding the RRO to the target radial position Ur1 to the computing unit C1 as a target radial position. The target radial position obtained by adding the RRO to the target radial position Ur1 and eccentric target position Ur2 are input to the computing unit C2. The computing unit C1 outputs an objective position Ur obtained by adding the eccentric target position Ur2 to a target radial position obtained by adding the RRO to the target radial position Ur1 to the computing unit C2. To the computing unit C2, the actual position y and objective position Ur are input. The computing unit C2 outputs a positioning error e obtained by subtracting the actual position y from the objective position Ur to the controller S1. To the controller S1, the positioning error e is input. The controller S1 outputs a drive amount Uf to the actuator S2. To the actuator S2, the drive amount Uf is input. The actuator S2 carries out drive according to the drive amount Uf, and moves the head HD to the actual position y corresponding to the drive amount Uf. The actuator S2 outputs the actual position y to the computing unit C2.

Figures 12, 13:
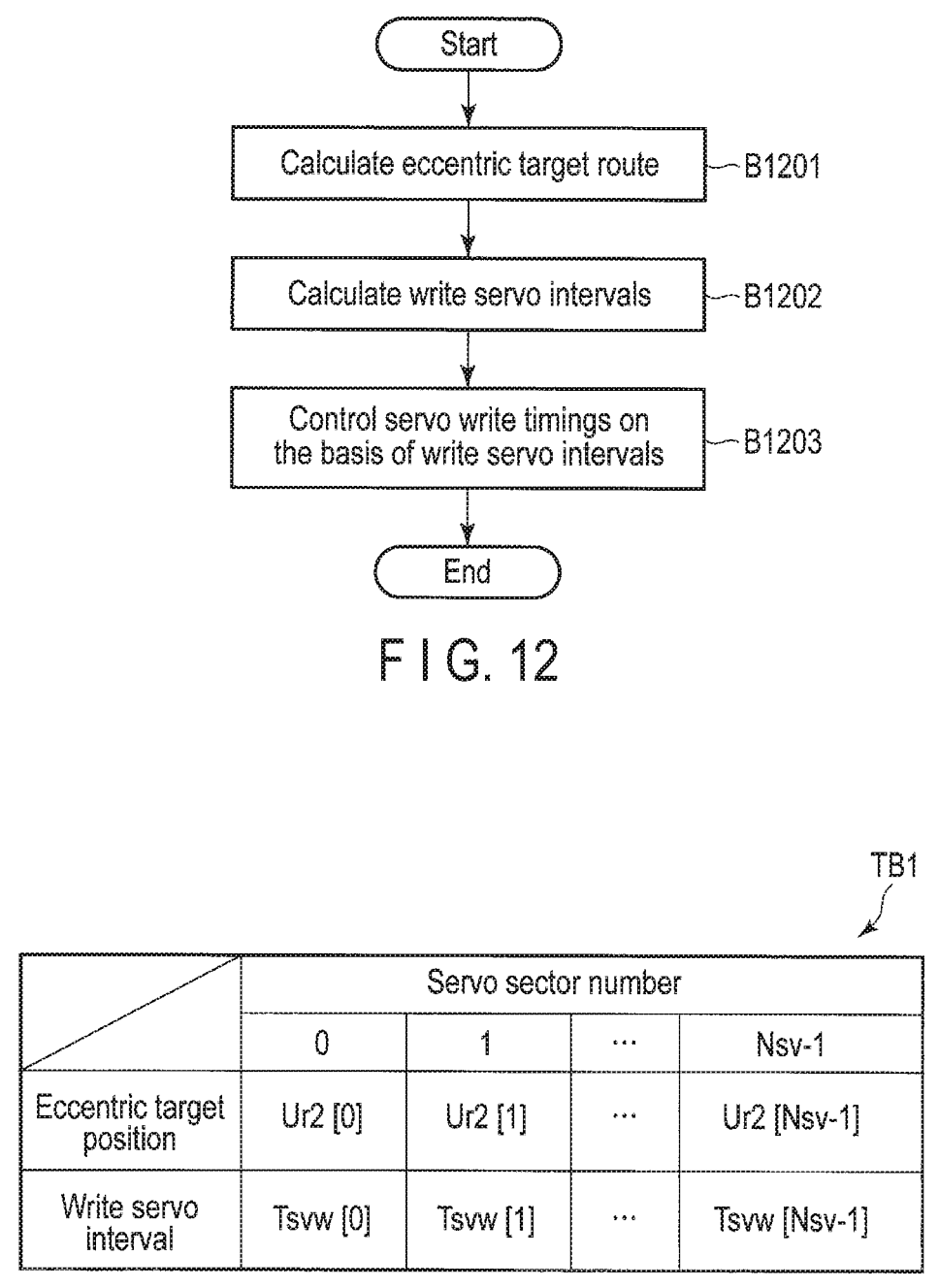

FIG. 12 is a flowchart showing an example of a control method of servo write according to this embodiment.

The system controller 130 calculates an eccentric target route corresponding to a particular servo track (B1201). For example, at the time of servo write, the system controller 130 calculates an eccentric target route obtained by adding an amount of eccentricity δ to the target route corresponding to the particular servo track. The system controller 130 calculates the write servo intervals Tsvw of the eccentric servo sectors in such a manner that the access servo intervals and access timings of the eccentric servo sectors corresponding to this servo track become equal within one round of the target route (B1202). The system controller 130 controls the servo write timings for writing the eccentric servo sectors corresponding to the servo track on the basis of the write servo intervals Tsvw of the eccentric servo sectors calculated in such a manner that the access servo intervals and access timings of the eccentric servo sectors corresponding to the particular servo track become equal within one round of the target route (B1203). In other words, the system controller 130 servo-writes the eccentric servo sectors corresponding the servo track on the basis of the write servo intervals Tsvw of the eccentric servo sectors calculated in such a manner that the access servo intervals and access timings of the eccentric servo sectors corresponding to the particular servo track become equal within one round of the target route.

According to this embodiment, the magnetic disk device 1 calculates the target route corresponding to a particular servo track and calculates the eccentric target route corresponding to this servo track on the basis of this target route and particular amount of eccentricity δ. The magnetic disk device 1 calculates the write servo interval Tsvw of the eccentric servo sectors in such a manner that the access servo intervals of the eccentric servo sectors corresponding to this servo track and access timings for accessing the eccentric servo sectors become equal within one round of the target route. The magnetic disk device 1 controls the servo write timings for writing the eccentric servo sectors corresponding to the servo track on the basis of the write servo interval Tsvw of the eccentric servo sectors calculated in such a manner that the access servo intervals of the eccentric servo sectors corresponding to the particular servo track and access timings for accessing the eccentric servo sectors become equal. In other words, the magnetic disk device 1 writes the eccentric servo sectors corresponding to the servo track on the basis of the write servo interval Tsvw of the eccentric servo sectors calculated in such a manner that the access servo intervals of eccentric servo sectors corresponding to the particular servo track and access timings for accessing the eccentric servo sectors become equal. The eccentric servo sectors corresponding to the particular servo track are written at equal access servo intervals and at equal access timings, whereby the magnetic disk device 1 can improve the efficiency of the servo control. Further, the magnetic disk device 1 writes the eccentric servo sectors in such a manner that the access servo intervals of the eccentric servo sectors corresponding to the particular servo track and access timings for accessing the eccentric servo sectors become equal, whereby the magnetic disk device 1 can write the user data at an equal recording density (bit per inch: BPI) on the basis of the eccentric servo sectors. By writing the user data at an equal recording density on the basis of the eccentric servo sectors, the magnetic disk device 1 can equalize the error rate. Accordingly, the magnetic disk device 1 can improve the access performance.

Next, magnet disk devices according to modification examples and other embodiments will be described below. In the modification examples and other embodiments, parts identical to the embodiment described previously are denoted by reference symbols identical to the embodiment and detailed descriptions of the parts are omitted.

MODIFICATION EXAMPLE 1

A magnetic disk device 1 of a modification example 1 differs from the first embodiment in the control method of servo write.

A system controller 130 acquires, from a table, eccentric target positions (eccentric target route) corresponding to eccentric servo sectors corresponding to a particular servo track, and write servo intervals of the eccentric servo sectors set in such a manner that the access servo intervals of the eccentric servo sectors and access timings for accessing the eccentric servo sectors become equal within one round of the target route, and controls the servo write timings for writing the eccentric servo sectors corresponding to the servo track on the basis of the eccentric target positions (eccentric target route) corresponding to the eccentric servo sectors and acquired from the table and write servo intervals of the eccentric servo sectors. In other words, the system controller 130 acquires, from the table, the eccentric target positions (eccentric target route) of the eccentric servo sectors corresponding to the particular servo track and write servo intervals or the eccentric servo sectors set in such a manner that the access servo intervals and access timings of the eccentric servo sectors become equal within one round of the target route, and writes the eccentric servo sectors on the basis of the eccentric target positions (eccentric target route) corresponding to the acquired eccentric servo sectors and write servo intervals of the eccentric servo sectors.

The table is recorded in a particular storage area, for example, the buffer memory 80, nonvolatile memory 90 or system area SA. For example, the table includes the eccentric target positions (eccentric target route) corresponding to, for example, a particular servo track, and write servo intervals of the eccentric servo sectors set in such a manner that the access servo intervals of the eccentric servo sectors of the servo track (hereinafter referred to as a current servo track) currently made the object and access timings for accessing these eccentric servo sectors become equal within one round of the target route. Further, the table may include the eccentric target positions corresponding so a particular servo track, write servo intervals of the eccentric servo sectors set in such a manner that the access servo intervals and access timings of the eccentric servo sectors of the current servo track become equal within one round of the target route, and write servo intervals of the eccentric servo sectors set in such a manner that the access servo intervals of the eccentric servo sectors of a servo track (hereinafter referred to as a next servo track) to be written next to the current servo track and access timings for accessing these eccentric servo sectors become equal within one round of the target route. It should be noted that the table may include the eccentric target positions corresponding to a particular servo track, write servo intervals of the eccentric servo sectors set in such a manner that the access servo intervals of the eccentric servo sectors of the current servo track and access timings for accessing these eccentric servo sectors become equal within one round of the target route, write servo intervals of the eccentric servo sectors set in such a manner that the access servo intervals of the eccentric servo sectors of the next servo track and access timings for accessing these eccentric servo sectors become equal within one round of the target route, and write servo intervals of the eccentric servo sectors set in such a manner that the access servo intervals of the eccentric servo sectors of a servo track to be written subsequently to the next track and access timings for accessing these eccentric servo sectors become equal within one round of a target route to be written subsequently to the next track.

FIG. 13 is a schematic view showing an example of a table TB1 according to the modification example 1. In FIG. 13, the table TB1 is shown. In the example shown in FIG. 13, the table TB1 includes servo sector numbers 0, 1, ..., Nsv−1, eccentric target positions Ur2[0], Ur2[1], ..., Ur2[Nsv−1], and write servo intervals Tsvw[0], Tsvw[1], ..., Tsvw[Nsv−1].

The system controller 130 controls, on the basis of the eccentric target positrons corresponding the eccentric servo sectors of a particular servo track acquired from the table TB1, and write servo intervals of the eccentric servo sectors set in such a manner that the access servo intervals and access timings of these eccentric servo sectors become equal within one round of the target route, the servo write timings for writing the eccentric servo sectors corresponding to the servo track.

FIG. 14 is a schematic view showing an example a table TB2 according to the modification example 1. In FIG. 14, the table TB2 is shown. In the example shown in FIG. 14, the table TB2 includes servo sector numbers 0, 1, ..., Nsv−1, eccentric target positions Ur2[0], Ur2[1], ..., Ur2[Nsv−1], write servo intervals Tsvw0[0], Tsvw0[1], ..., Tsvw0[Nsv−1], and write servo intervals Tsvw1[0], Tsvw1[1], ..., Tsvw1[Nsv−1].

The system controller 130 controls, on the basis of the eccentric target positions corresponding to the eccentric servo sectors of a particular servo track acquired from the table TB2, and write servo intervals of the eccentric servo sectors set in such a manner that the access servo intervals and access timings of these eccentric servo sectors become equal within one round of the target route, the servo write timings for writing the eccentric servo sectors corresponding to the particular servo track. When there is no command processing, for example, at time of idle, at the time of seek, or at the time of a background process the system controller 130 may update the eccentric target positions corresponding to the eccentric servo sectors of the particular servo track of the table TB2, write servo intervals corresponding to the eccentric servo sectors of the current servo track, and write servo intervals corresponding to the eccentric servo sectors of the next track.

FIG. 15 is a flowchart showing an example of a control method of servo write according to the modification example 1.

The system controller 130 acquires an eccentric target route corresponding to a particular servo track from a particular table (B1501). The system controller 130 acquires the write servo intervals of these eccentric servo sectors set in such a manner that the access servo intervals and access timings of the eccentric servo sectors corresponding to this servo track become equal within one round of the target route (B1502). The system controller 130 controls the servo write timings for writing the eccentric servo sectors corresponding to the servo track on the basis of the eccentric target route of the eccentric servo sectors corresponding to the particular servo track acquired from the table, and write servo intervals of the eccentric servo sectors set in such a manner that the access servo intervals and access timings of the eccentric servo sectors corresponding to the servo track become equal within one round of the target route (B1503).

According to the modification example 1, the magnetic disk device 1 controls the servo write timings for writing the eccentric servo sectors corresponding to the servo track on the basis of the eccentric target route of the eccentric servo sectors corresponding to the particular servo track acquired from the table, and write servo intervals of the eccentric servo sectors set in such a manner that the access servo intervals and access timings of the eccentric servo sectors corresponding to this servo track become equal within one round of the target route. Accordingly, the magnetic disk device 1 can improve the access performance.

MODIFICATION EXAMPLE 2

A magnetic disk device 1 of the modification example 2 differs from the first embodiment described previously in the control method of servo write.

A system controller 130 writes eccentric servo sectors corresponding to a particular servo track according to an eccentric target route, measures the write servo intervals with respect to the written eccentric servo sectors, and records the eccentric target positions of the eccentric servo sectors corresponding to the eccentric target route and measured write servo intervals of the eccentric servo sectors as a table. The system controller 130 acquires, from the table, the eccentric target routes corresponding to the particular servo track, and write servo intervals of the eccentric servo sectors set in such a manner that the access servo intervals and access timings of the servo sectors corresponding to the particular servo track become equal within one round of the target route. The system controller 130 controls the servo timings for writing the eccentric servo sectors corresponding to the servo track on the basis of the eccentric target routes corresponding to the eccentric servo sectors acquired from the table and write servo intervals of the eccentric servo sectors corresponding to the servo track. In other words, the system controller 130 writes the eccentric servo sectors corresponding to the servo track on the basis of the eccentric target routes of the eccentric servo sectors corresponding to the particular servo track acquired from the table and write servo intervals of the eccentric servo sectors.

In one example, in the design process, the system controller 130 writes the eccentric servo sectors corresponding to a particular servo track according to an eccentric target route formed by adding a particular amount of eccentricity, for example, a triangular waveform to a particular target route as an amount of deviation for each particular recording area of the disk DK, for example, for each zone or for each track, and measures the write servo intervals with respect to the eccentric servo sectors written for each particular recording area. The system controller 130 records, as a table, the eccentric target positions of the eccentric servo sectors corresponding to the eccentric target route and measured write servo intervals of the eccentric servo sectors for each particular recording area in a particular storage area, for example, the buffer memory 80, nonvolatile memory 90 or system area SA. It should be noted that the system controller 130 may calculate the write servo intervals of the eccentric servo sectors of each recording area in such a manner that the access servo intervals of the eccentric servo sectors corresponding to the servo tracks for each particular recording area and access timings for accessing the eccentric servo sectors corresponding to the servo tracks become equal within one round of the target route, and may record the calculated write servo intervals of the eccentric servo sectors and eccentric target positions of the eccentric servo sectors corresponding to the eccentric target route in the particular storage area as a table. The system controller 130 calculates the eccentric target position Ur2 obtained by adding a first-order triangular waveform to a target route of, for example, a particular track, for example, particular servo track as an amount of deviation by using the following formula.

$$Ur2 = \delta \frac{8}{\pi^2} \sum_{k=1}^{kmax} \left\{ \sin\left(\frac{k\pi}{2}\right) \frac{\sin(k\varphi)}{k^2} \right\} \quad \text{formula (8)}$$

Here, kmax indicates the highest order.

In the manufacturing process, the system controller 130 acquires, from the table acquired in the design process, the eccentric target route corresponding to a particular servo track, and write servo intervals of the eccentric servo sectors set in such a manner that the access servo intervals and access timings of the eccentric servo sectors corresponding to the servo track become equal within one round of the target route. The system controller 130 controls the servo timings for writing the eccentric servo sectors of the servo track on the basis of the eccentric target route corresponding to the particular servo track acquired from the table and write servo intervals of the eccentric servo sectors corresponding to the servo track. The system controller 130 calculates the write servo intervals of the eccentric servo sectors corresponding to a particular track (servo track) not recorded in the table and positioned between two tracks (servo tracks) recorded in the table and arranged in the radial direction by linear interpolation or by interpolation using the characteristics that a difference from an average value of variations in write servo interval is proportionate to 1/r on the basis of two write servo intervals respectively corresponding to these two tracks (servo tracks) recorded in the table.

FIG. 16 is a schematic view showing an example of a table TB3 according to the modification example 2. In FIG. 16, the table TB3 is shown. In the example shown in FIG. 16, the table TB3 includes servo sector numbers 0, 1, . . . , Nsv-1, eccentric target positions Ur2[0], Ur2[1], . . . , Ur2[Nsv-1], and write servo intervals corresponding to a particular servo track of each zone. The write servo intervals corresponding to a particular servo track of each zone include, for example, write servo intervals Tsvw0[0], Tsvw0[1], . . . , Tsvw0[Nsv-1] corresponding to a particular servo track of Zone0, and write servo intervals Tsvwx[0], Tsvwx[1], . . . , Tsvwx[Nsv-1] corresponding to a particular servo track of Zonex.

In the design process, the system controller 130 writes eccentric servo sectors corresponding to a particular servo track according to a particular eccentric target route for each zone of the disk DK, and measures the write servo intervals, for example, the write servo intervals of the eccentric servo sectors corresponding to the particular servo track of Zone0, i.e., Tsvw0[0], Tsvw0[1], . . . , Tsvw0[Nsv-1], and write servo intervals of the eccentric servo sectors corresponding to the particular servo track of Zonex, i.e., Tsvwx[0], Tsvwx[1], . . . , Tsvwx[Nsv-1] with respect to the eccentric servo sectors written for each zone. The system controller 130 records the eccentric target positions corresponding to the eccentric target route, i.e., Ur2[0], Ur2[1], . . . , Ur2[Nsv-1] and measured write servo intervals of the eccentric servo sectors for each zone in a particular storage area, for example, the buffer memory 80, nonvolatile memory 90 or system area SA as the table TB3.

In the manufacturing process, the system controller 130 acquires the eccentric target route corresponding to the particular servo track, and write servo intervals of the eccentric servo sectors set in such a manner that the access servo intervals and access timings of the eccentric servo sectors corresponding to the servo track become equal within one round of the target route from the table TB3 acquired in the design process. The system controller 130 controls the servo write timings for writing the eccentric servo sectors of the servo track on the basis of the eccentric target route corresponding to the servo track acquired from the table TB3 and write servo intervals of the eccentric servo sectors corresponding to the servo track.

FIG. 17 is a flowchart showing an example of a control method of servo write according to the modification example 2.

The system controller 130 writes the eccentric servo sectors corresponding to a particular servo track according to an eccentric target route for each particular recording area of the disk DK, and measures the write servo intervals with respect to the eccentric servo sectors written for each particular recording area (B1701). The system controller 130 records the eccentric target positions of the eccentric servo sectors corresponding to the eccentric target route and measured write servo intervals of the eccentric servo sectors for each particular recording area in a particular storage area as a table (B1702). The system controller 130 acquires an eccentric target route corresponding to the particular servo track from the table (B1501). The system controller 130 acquires the write servo intervals of the servo sectors set in such a manner that the access servo intervals and access timings of the eccentric servo sectors corresponding to the servo track become equal within one round of the target route (B1502). The system controller 130 controls the servo write timings for writing the eccentric servo sectors corresponding to the servo track on the basis of the acquired eccentric target route corresponding to the particular servo track, and write servo intervals of the eccentric servo sectors corresponding to the servo track set in such a manner that the access servo intervals and access timings of the eccentric servo sectors corresponding to the servo track become equal within one round of the target route (B1503).

According to the modification example 2, the magnetic disk device 1 writes the eccentric servo sectors corresponding to the particular track according to the eccentric target route for each particular recording area of the disk DK, and measures the write servo intervals with respect to the eccentric servo sectors written for each particular recording area. The magnetic disk device 1 records the eccentric target positions of the eccentric servo sectors corresponding to the eccentric target route and measured write servo intervals of the eccentric servo sectors for each particular recording area in the particular storage area as a table. The magnetic disk device 1 acquires, from the table, the eccentric target route corresponding to the particular servo track, and write servo intervals of the servo sectors corresponding to the servo track set in such a manner that the access servo intervals and access timings of the eccentric servo sectors corresponding to the servo track become equal within one round of the target route. The magnetic disk device 1 controls the servo write timings for writing the eccentric servo sectors corresponding to the servo track on the basis of the eccentric target route corresponding to the particular servo track acquired from the table and write servo intervals of the eccentric servo sectors corresponding to the servo track. Accordingly, the magnetic disk 1 can improve the access performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a disk;
   a head configured to write data to the disk or read data from the disk; and
   a controller configured to, when writing a first servo sector, a second servo sector, and a third servo sector in the order described according to a second route varying in a radial direction of the disk with respect to a first route and extending in a circumferential direction of the disk,
   adjust first timing used to write the second servo sector next to the first servo sector in such a manner that a first servo interval between the first servo sector and the second servo sector on the second route corresponds to a first interval between the first servo sector and the second servo sector on the first route, and
   adjust second timing used to write the third servo sector next to the second servo sector in such a manner that a second servo interval between the second servo sector and the third servo sector on the second route corresponds to a second interval between the second servo sector and the third servo sector on the first route.

2. The magnetic disk device of claim 1, wherein the controller acquires the second route, the first servo interval, and the second servo interval from a table.

3. The magnetic disk device of claim 2, wherein the table includes the second route, third servo intervals between servo sectors of a first servo track to be written according to the second route in such a manner that intervals between the servo sectors at the time when accessing is carried out according to the first route become equal, and fourth servo intervals between servo sectors of a second servo track to be written next to the first servo track according to the second route in such a manner that intervals of the servo sectors at the time when accessing is carried out according to the first route after writing servo sectors according to the second route next to the first servo track become equal.

4. The magnetic disk device of claim 3, wherein the controller updates the fourth servo intervals during a seek of the head or in a background process.

5. The magnetic disk device of claim 2, wherein the controller writes servo tracks according to the second route for each zone formed by dividing the disk in the radial direction, and records servo intervals measured with respect to the second route and the servo tracks as a table.

6. The magnetic disk device of claim 1, wherein the first route is concentric with the disk.

7. The magnetic disk device of claim 6, wherein the second route is sinusoidal.

8. The magnetic disk device of claim 6, wherein the second route possesses a form of a triangular wave.

9. The magnetic disk device of claim 1, wherein the first interval and the second interval are equal to each other.

10. The magnetic disk device of claim 1, wherein the first servo interval and the second servo interval are different from each other.

11. A control method of servo write to be applied to a magnetic disk device including a disk, and a head configured to write data to the disk or read data from the disk, comprising:
    adjusting, when writing a first servo sector, a second servo sector, and a third servo sector in the order described according to a second route varying in a radial direction of the disk with respect to a first route and extending in a circumferential direction of the disk, first timing used to write the second servo sector next to the first servo sector in such a manner that a first servo interval between the first servo sector and the second servo sector on the second route corresponds to a first interval between the first servo sector and the second servo sector on the first route;
    and adjusting second timing used to write the third servo sector next to the second servo sector such a manner that a second servo interval between the second servo sector and the third servo sector on the second route corresponds to a second interval between the second servo sector and the third servo sector on the first route.

12. The control method of servo write of claim 11, further comprising:

acquiring the second route, the first servo interval, and the second servo interval from a table.

13. The control method of servo write of claim 12, wherein the table includes the second route, third servo intervals between servo sectors of a first servo track to be written according to the second route in such a manner that intervals between the servo sectors at the time when accessing is carried out according to the first route become equal, and fourth servo intervals between servo sectors of a second servo track to be written next to the first servo track according to the second route in such a manner that intervals of the servo sectors at the time when accessing is carried out according to the first route after writing servo sectors according to the second route next to the first servo track become equal.

14. The control method of servo write of claim 13, further comprising:

updating the fourth servo intervals during a seek of the head or in a background process.

15. The control method of servo write of claim 12, further comprising:

writing servo tracks according to the second route for each zone formed by dividing the disk in the radial direction, and recording servo intervals measured with respect to the second route and the servo tracks as a table.

16. The control method of servo write of claim 11, wherein the first interval and the second interval are equal to each other.

17. The control method of servo write of claim 11, wherein the first servo interval and the second servo interval are different from each other.

* * * * *